United States Patent
Bressan et al.

(10) Patent No.: US 9,868,839 B2
(45) Date of Patent: Jan. 16, 2018

(54) PROCESS FOR THE PRODUCTION OF CROSSLINKED PVC FOAMS AND COMPOSITIONS USED FOR THE EMBODIMENT OF SAID PROCESS

(71) Applicant: DIAB INTERNATIONAL AB, Laholm (SE)

(72) Inventors: Raffaela Bressan, Oderzo-Treviso (IT); Eva-Lotta Magdalena Petersson, Bastad (SE)

(73) Assignee: DIAB INTERNATIONAL AB, Laholm (SE)

( * ) Notice: Subject to any disclaimer, the term of this patent is extended or adjusted under 35 U.S.C. 154(b) by 0 days.

(21) Appl. No.: 15/109,603

(22) PCT Filed: Jan. 14, 2015

(86) PCT No.: PCT/EP2015/000055
§ 371 (c)(1),
(2) Date: Jul. 1, 2016

(87) PCT Pub. No.: WO2015/113735
PCT Pub. Date: Aug. 6, 2015

(65) Prior Publication Data
US 2016/0362532 A1 Dec. 15, 2016

(30) Foreign Application Priority Data

Jan. 30, 2014 (IT) .............................. MI2014A0125

(51) Int. Cl.
*C08J 9/12* (2006.01)
*C08J 9/14* (2006.01)

(52) U.S. Cl.
CPC .............. *C08J 9/146* (2013.01); *C08J 9/141* (2013.01); *C08J 2201/026* (2013.01); *C08J 2203/12* (2013.01); *C08J 2203/14* (2013.01); *C08J 2203/142* (2013.01); *C08J 2203/162* (2013.01); *C08J 2327/06* (2013.01)

(58) Field of Classification Search
CPC ..... C08J 9/12; C08J 9/141; C08J 9/143; C08J 2201/026; C08J 2203/14; C08J 2327/06
See application file for complete search history.

(56) References Cited

U.S. PATENT DOCUMENTS

| | | | |
|---|---|---|---|
| 3,267,051 A | 8/1966 | Lendler et al. | |
| 4,383,048 A * | 5/1983 | Hall ...................... | C08J 9/0066 264/DIG. 5 |
| 4,427,795 A * | 1/1984 | Dorrestijn .............. | C08J 9/0061 264/53 |
| 4,469,819 A * | 9/1984 | Lemoine ................... | C08J 9/08 264/54 |
| 7,879,922 B2 | 2/2011 | Vazquez | |
| 2009/0131546 A1* | 5/2009 | Vazquez .................. | C08F 2/48 521/137 |
| 2010/0068487 A1* | 3/2010 | Lauri ..................... | B23K 20/10 428/218 |
| 2012/0189837 A1* | 7/2012 | Lavallee ................. | C08L 27/06 428/304.4 |

FOREIGN PATENT DOCUMENTS

| | | | | |
|---|---|---|---|---|
| EP | 0305862 A1 | 3/1989 | | |
| WO | WO-2011154161 A1 * | 12/2011 | ............ | B29C 44/02 |
| WO | WO2012007106 A1 | 1/2012 | | |
| WO | WO-2014106867 A1 * | 7/2014 | ............ | C08J 9/0023 |

* cited by examiner

Primary Examiner — Kara B Boyle
(74) Attorney, Agent, or Firm — Themis Law

(57) ABSTRACT

A process for the production of crosslinked PVC foams includes the preparation of a polymeric mixture based on PVC, isocyanate, anhydride, nucleating agent and a physical blowing agent, heating this mixture in a reaction mold, cooling the polymeric mass thus obtained, opening the mold in order to extract the microcellular embryo, and expanding and completing the crosslinking reactions of the embryo in an oven.

4 Claims, No Drawings

PROCESS FOR THE PRODUCTION OF CROSSLINKED PVC FOAMS AND COMPOSITIONS USED FOR THE EMBODIMENT OF SAID PROCESS

The present invention relates to an improved process for the production of crosslinked PVC foams. The invention is also extended to compositions used for this process, the crosslinked PVC foams obtained with this process and the bodies of expanded material obtained with these foams.

The field of the invention relates to the production of crosslinked PVC foams, normally used in the production of panels, suitably processed to make them appropriate as core material for numerous types of structural sandwiches and also for thermal and sound insulation.

More specifically, the process for the production of crosslinked PVC foams essentially comprises the preparation of a paste which consists of a mixture of powders and liquids. Said paste contains, according to the known art (WO2007141647, WO2012007106, WO2005092958), PVC in emulsion (suitable for forming pastes), isocyanates, anhydrides, various additives and chemical blowing agents or propellants, in particular azodiisobutyronitrile (AIBN or AZDN). Chemical blowing agents, essential in the field of known processes for the production of rigid PVC foams, during the heating cycle to 150-180° C. in a press, chemically decompose, by exothermic reaction activated by the temperature, producing nitrogen. This gaseous nitrogen in turn generates the microcellular structure in the embryo, indispensable for the wet expansion process. This microcellular structure, in fact, allows the water to be diffused inside the same embryo and the water reacts with the isocyanate and anhydride, producing further gas ($CO_2$) and mainly polyureas and polyamides. This leads to, the expansion of the embryo, which reaches the desired dimensions and densities which depend on the starting formulation. Furthermore, starting from a rubbery embryo, the material expands until a rigid block is formed, wherein the hardening is due to the formation of a crosslinked structure consisting of polyureas and polyamides. The crosslinking reactions are then completed in a crosslinking or curing process at lower temperatures, still in the presence of water.

A limitation in the use of chemical blowing agents, in particular AIBN, is their dangerousness, as this is a raw material classified among explosive substances. There is therefore a series of counter indications, among which:
  the high production cost of AIBN, which influences the overall cost of the raw material;
  the handling of an explosive raw material, which increases the process costs;
  risks for the environment and also for the operators.

Furthermore, due to the easily decomposable nature of AIBN, there are qualitative problems linked to the complex temperature control and storage times. A non-perfect control of the temperatures or excessively lengthy storage periods can cause a premature partial decomposition of the AIBN, thus reducing the quantity of nitrogen formed in the embryo for a certain dosed percentage of AIBN in the system.

U.S. Pat. No. 3,267,051 A relates to a method for manufacturing rigid cellular products based on PVC, in which chemical blowing agents such as AIBN (AZDN) are used.

U.S. Pat. No. 7,879,922 B2 discloses a method for manufacturing PVC foams, wherein a mixture containing n-pentane is prepared and the embryo is cooled to a temperature lower than the boiling point of the n-pentane.

The main objective of the present invention is to provide a method suitable for producing a crosslinked PVC foam in the absence of AIBN in the formulation.

This and other objectives are achieved by means of the process and composition of claims 1 and 5, respectively. Preferred embodiments of the invention are indicated in the remaining claims.

Compared to analogous methods of the known art, that of the invention offers the advantage of providing a crosslinked PVC foam, in which the gas function for the production of the microcellular structure of the embryo is mainly provided by a physical blowing agent (PBA) and no longer chemical. This avoids the presence in the reaction mixture of raw materials of an explosive nature, with advantageous reflections on the production costs, handling of the raw material and risks for the environment and operators. At the same time, the traditional phenomena of premature decomposition of the blowing agent are avoided.

The physical blowing agent used in the invention is in particular a low-boiling liquid, whose boiling point ranges from 30° C. to critical T (Tc), the latter representing the maximum temperature over which the embryo does not have a consistency which is such as to keep the gas phase entrapped in microcells, with a consequent collapse of said microcells into non-uniform cells. In the case of the present invention, in which crosslinked PVC foams are produced, the critical temperature is lower than 87° C.

The physical blowing agent used in the process of the invention does not provide any thermal contribution, whereas the chemical blowing agents used in traditional processes for the production of crosslinked PVC foams provide the heat produced by the exothermic decomposition reaction of the same. This heat is in fact necessary for the reactions, in order to keep the process times at advantageous levels. For this reason, the total removal of AIBN makes it necessary to provide the reaction environment with the heat necessary for the gelling process of the PVC and crosslinking process of the isocyanates; this heat can be generated by any means used in the field, preferably with the use of the trimerization catalyst described in patent WO2012007106.

Physical blowing agents suitable for the present invention are all low-boiling liquids, with a boiling point ranging from room temperature to 80° C., preferably from 30° C. to 75° C.

In a process utilizing a PBA of the invention, which is liquid at room temperature, during the press cycle, the cooling temperature of the crosslinked polymeric mass which is inside the mould, must be controlled, so that the minimum temperature of this polymeric mass is higher than the boiling point of the PBA. This ensures the formation of a homogeneous microcellular structure in the embryo extracted from the mould, which is the essential condition for having an embryo suitable for producing a crosslinked PVC foam, qualitatively suitable for the use for which it is destined.

More specifically, physical blowing agents (PBAs) suitable for the invention are selected from:
  cyclopentane ($C_5H_{10}$)
  N-pentane ($C_5H_{12}$)
  decafluoropentane ($CF_3CHFCHFCF_2CF_3$)
  hexafluorobutene ($CF_3CH{=}CHCF_3$)
  methyl formate ($HCOOCH_3$)
  dimethoxymethane ($CH_3OCH_2OCH_3$)
  penta fluoro butane ($CF_3CH_2CF_2CH_3$)
  and their mixtures.

The compositions of the invention essentially comprise (weight %):

| | |
|---|---|
| PVC | 35-60% |
| Isocyanates | 20-60% |
| Nucleating agents | 0.1-0.8% |
| Physical blowing agent | 1-7% |

The compositions of the invention can also advantageously comprise an acid anhydride, in a quantity ranging from 1 to 20% by weight. trimerization catalyst in a quantity ranging from 0.01 to 0.3% by weight, a silicon surfactant ranging from 0.08 to 0.8% by weight and other additives ranging from 0.1 to 5% by weight, can also be advantageously envisaged.

The invention will now be described with reference to the following examples, provided for purely illustrative and non-limiting purposes.

In the tables, the following symbols are used:

PBA cyclopentane (physical blowing agent)

AN anhydride (stabilizer-crosslinking agent)

AZDN (AIBN) azodiisobutyronitrile (chemical blowing agent)

ADC azodicarbonamide (nucleating agent)

CD-MDI isocyanate (crosslinking agent)

PMDI polyfunctional isocyanate (crosslinking agent).

EXAMPLE 1 (KNOWN ART ACCORDING TO WO2007141647)

The composition used in the example is indicated in Table 1 below:

TABLE 1

| Component | Weight % |
|---|---|
| PVC | 48 |
| AN | 6 |
| AZDN(AIBN) | 3.5 |
| ADC | 0.7 |
| CD-MDI | 35.5 |
| PMDI | 6 |
| Surfactant | 0.3 |

The paste is prepared by mixing the components according to the formulation of Table 1, then applying a vacuum under stirring for a time ranging from 3 to 12 minutes. The paste is poured into a mould. The closed mould is put into a press which applies a pressure of 100-200 bar in the cavity of the mould. The mould with the paste are heated to a temperature of 160-180° for a period of about 20 minutes (about 40 sec/mm cavity of the mould, the depth of the cavity of the mould is about 29 mm). The mould is then cooled with water until a temperature of 75-85° C. is reached in the centre of the mould for a time of 25-35 minutes. At the end of the cooling, the microcellular embryo is extracted from the mould and expanded in an oven at a temperature of 85-95° C., also in the presence of water. A curing treatment is then effected for a period of 4-7 days at 50-70° C. A foam is thus obtained, having a density of 60 Kg/m$^3$.

EXAMPLE 2 (INVENTION)

According to the invention, a composition is prepared as indicated in Table 2:

TABLE 2

| Component | Weight % |
|---|---|
| PVC | 39.5 |
| AN | 2.4 |
| ADC | 0.4 |
| CD-MDI | 16 |
| PMDI | 34.6 |
| Surfactant | 0.1 |
| PBA | 6 |
| Stabilizing additives | 1 |

The paste is prepared by mixing the components without the PBA, in this case cyclopentane, then applying a vacuum under stirring for a period of 3 to 12 minutes, subsequently adding the cyclopentane under stirring. The paste is poured into a mould. The closed mould is put into a press which applies a pressure of 100-200 bar in the cavity of the mould. The mould with the paste are heated to a temperature of 160-180° C. for a period of about 40 minutes (about 80 sec/mm cavity of the mould, the depth of the cavity of the mould is about 29 mm). The mould is then cooled with water until a temperature of 75-85° C. is reached in the centre of the mould for a time of 25-35 minutes, guaranteeing that in no point of the cooled polymeric mass does the temperature drop below the boiling point of the PBA, in this case with cyclopentane Tc=49° C. At the end of the cooling, the microcellular embryo is extracted from the mould and expanded in an oven at a temperature of 85-95° C., also in the presence of water. A completion phase of the crosslinking reactions is then effected for a period of 4-7 days at 50-70° C. in the presence of humidity. A foam is thus obtained, having a density of 60 Kg/m$^3$.

EXAMPLE 3 (INVENTION)

In this example (see Table 3), the composition of Example 2 is integrated with a catalyst based on a quaternary ammonium carboxylate salt, in particular hydroxy trimethyl formiate (2-HYDROXY PROPYL TRIMETHYL AMMONIUM FORMATE C$_7$H$_{17}$NO$_3$):

TABLE 3

| Component | Weight % |
|---|---|
| PVC | 39.5 |
| AN | 2.4 |
| ADC | 0.4 |
| CD-MDI | 16 |
| PMDI | 34.4 |
| Surfactant | 0.1 |
| PBA | 6 |
| Stabilizing additives | 1 |
| Catalyst | 0.2 |

The paste is prepared by mixing the components according to the formulation of Table 3, without the PBA-cyclopentane, then applying a vacuum under stirring for a period of 3 to 12 minutes, subsequently adding the cyclopentane under stirring. The paste is poured into a mould. The closed mould is put into a press which applies a pressure of 100-200 bar in the cavity of the mould. The mould with the paste are heated to a temperature of 160-180° C. for a period of about 10 minutes (20 sec/mm cavity of the mould, the depth of the cavity of the mould is about 29 mm). The mould is then cooled with water until a temperature of 75-85° C. is reached in the centre of the mould for a time of 25-35 minutes, guaranteeing that in no point of the cooled polymeric mass does the temperature drop below the boiling point of the PBA, in this case cyclopentane (Tc=49°). At the end of the cooling, the microcellular embryo is extracted from the mould and expanded in an oven at a temperature of 85-95° C., also in the presence of water. A curing treatment is then effected for a period of 4-7 days at 50-70° C. A foam is thus obtained, having a density of 60 Kg/m³.

EXAMPLE 4 (INVENTION)

In this example, a mixture of PBAs (PBA1=cyclopentane with Tc=49° C.; PBA2=pentafluorobutane with Tc=40° C.), is used, according to the following formulation (Table 4):

| Component | Weight % |
| --- | --- |
| PVC | 35-60 |
| AN | 1-20 |
| ADC | 0.1-0.8 |
| CD-MDI | 20-60 |
| PMDI | 20-60 |
| Surfactant | 0.08-0.8 |
| PBA-1 | 1-7 |
| PBA-2 | 1-7 |
| Stabilizing additives | 0-1.5 |
| Catalyst | 0.01-0.3 |

The paste is prepared by mixing the components according to the formulation of Table 4, without PBA1 and PBA2, then applying a vacuum under stirring for a period of 3 to 12 minutes, subsequently adding the two PBAs under stirring. The paste is poured into a mould. The closed mould is put into a press which applies a pressure of 100-200 bar in the cavity of the mould. The mould with the paste are heated to a temperature of 160-180° C. for a period of about 10 minutes (20 sec/mm cavity of the mould, the depth of the cavity of the mould is about 29 mm). The mould is then cooled with water until a temperature of 75-85° C. is reached in the centre of the mould for a time of 25-35 minutes, guaranteeing that in no point of the cooled polymeric mass does the temperature drop below the boiling point of the PBA having the highest boiling point (in this case cyclopentane). At the end of the cooling, the microcellular embryo is extracted from the mould and expanded in an oven at a temperature of 85-95° C., also in the presence of water. A curing treatment is then effected for a period of 4-7 days at 50-70° C. A foam is thus obtained, having a density of 60 Kg/m³.

The invention claimed is:

1. A process for production of crosslinked PVC foams, comprising:
   preparing a PVC-based polymeric mixture;
   heating the polymeric mixture in a reaction mold under pressure and producing a polymeric mass;
   cooling the polymeric mass thus obtained and producing a microcellular embryo;
   opening the mold and extracting the microcellular embryo; and
   expanding said embryo and subsequently completing crosslinking reactions of said embryo,
   wherein the step of preparing the PVC-based polymeric mixture comprises adding, to said PVC-based polymeric mixture, at least one physical blowing agent (PBA), and
   wherein said embryo is cooled, inside the mold, to a minimum temperature higher than a boiling point of said at least one physical blowing agent.

2. The process according to claim 1, wherein said physical blowing agent is a low-boiling liquid with a boiling point ranging from room temperature to 80° C.

3. The process according to claim 2, characterized in that said physical blowing agent is a compound selected from the group consisting of:
   cyclopentane ($C_5H_{10}$),
   N-pentane ($C_5H_{12}$),
   decafluoropentane ($CP_3CHFCHFCF_2CF_3$),
   hexafluorobutene ($CF_3CH=CHCF_3$),
   methyl formate ($HCOOCH_3$),
   dimethoxymethane ($CH_3OCH_2OCH_3$),
   penta fluoro butane ($CF_3CH_2CF_2CH_3$), and
   mixtures thereof.

4. The process according to claim 1, wherein the step of preparing the PVC-based polymeric mixture comprises preparing a polymeric mixture comprising PVC, stabilizing-crosslinking agents, and nucleating agents.

* * * * *